(12) United States Patent
Yamamoto

(10) Patent No.: US 6,246,679 B1
(45) Date of Patent: Jun. 12, 2001

(54) INTEGRATED COMMUNICATION SYSTEM OF VOICE AND DATA

(75) Inventor: Kunio Yamamoto, Kanagawa (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/121,196

(22) Filed: Jul. 22, 1998

(30) Foreign Application Priority Data

Mar. 13, 1998 (JP) .................................................. 10-062541

(51) Int. Cl.[7] ........................... H04Q 11/04; H04L 12/28; H04L 12/46; H04M 11/06
(52) U.S. Cl. ........................... 370/352; 370/395; 370/404; 370/524; 379/88.17; 379/93.07
(58) Field of Search .................................... 370/352, 353, 370/354, 389, 395, 401, 402, 403, 404, 463, 468, 522, 524, 535; 379/88.17, 93.01, 93.05, 93.06, 93.07, 93.09, 93.14, 93.15, 201, 219, 220

(56) References Cited

U.S. PATENT DOCUMENTS

| | | | |
|---|---|---|---|
| 4,872,160 | * 10/1989 | Hemmady et al. | 370/60 |
| 4,958,341 | * 9/1990 | Hemmady et al. | 370/60.1 |
| 5,014,269 | 5/1991 | Picandet | 370/85.11 |
| 5,276,679 | 1/1994 | McKay et al. | 370/84 |
| 5,412,660 | * 5/1995 | Chen et al. | 370/110.1 |
| 5,640,449 | 6/1997 | Worley et al. | 379/201 |
| 5,689,553 | * 11/1997 | Ahuja et al. | 379/202 |
| 5,982,767 | * 11/1999 | McIntosh | 370/352 |
| 5,987,039 | * 11/1999 | Wada et al. | 370/524 |
| 6,081,517 | * 6/2000 | Liu et al. | 370/352 |

\* cited by examiner

Primary Examiner—Alpus H. Hsu
(74) Attorney, Agent, or Firm—Helfgott & Karas, P.C.

(57) ABSTRACT

An integrated communication system for voice and data connecting an Ethernet LAN to an external communication network by utilizing a conventional communication system. An interface connected to the Ethernet LAN and transferring a voice signal at a data link level without processors is stored in a personal computer. An ISDN voice interface for connecting the personal computer to the external communication network with a voice channel is connected to the LAN. The input/output data of the ISDN voice interface and various routers performing data communication on the LAN is multiplexed/demultiplexed in a plurality of channels by an ADSL multiplexer. The input/output data of the multiplexer is connected to the external communication network through an access network having a user interface.

17 Claims, 22 Drawing Sheets

G : TOTAL NUMBER OF VOICELESS
DATA FRAME CONTINUOUSLY
GENERATED ON RECEPTION SIDE

D : ABANDONED FRAME NUMBER
RECEIVED FROM TRANSMISSION
SIDE

INTEGRATED COMMUNICATION SYSTEM OF VOICE AND DATA

BACKGROUND OF THE INVENTION

1. Field of the Invention

The present invention relates to an integrated communication system of voice and data, and in particular to an integrated communication system of voice and data which connects an Ethernet LAN to an external communication network.

Communication arts for a voice signal which is an analog signal and for data which is a digital signal have been developed individually. In the mean time, the voice signal has been able to be processed as voice data by converting the analog signal into the digital signal. Accordingly, in view of the advantages, a communication system which can process both signals in an integrated unit has been required.

2. Description of the Related Art

In a conventional office, as shown in FIG. 22, voice communication has been realized between a telephone terminal equipments TE and PBX (Private Branch exchange machine).

Data communication such as a mail or the like in the office has been realized by a LAN system of a client-server type in which a personal computer (PC) 2, a server 5, and a router 6 are mutually connected through an Ethernet LAN.

Outside the office, a voice signal is transferred from the PBX to a narrow band switching network (NBW NW) 10 through a pair of telephone stations circuits 9.

Also outside the office, the data communication has been realized by leading in a leased line network (LL NW) or a frame relay network (FR NW) 12 connected to other offices or internet network 14 into the office through the server 5 or the router 6. It is to be noted that the leased line network or the frame relay network 12 can be substituted by a narrow band switching network in case that data communication quantity outside the office is very little.

As a result, a personal computer and a telephone for voice communication to be connected to the LAN are required on a desk in the office, thereby narrowing an effective space on the desk. Also, a number of lines creep over the floor in the office. Although having been made smaller in size, the PBX accommodating several tens or hundreds of telephones is still large in size so that the office floor space for the PBX has to be wide.

Moreover, a lead-in wire from the outside of the office requires several pair wires or coaxial wires for the data communication in addition to voice pair wires.

Also, there has been increasing a case where a large quantity of data is taken in from a personal computer through internet WWW (World Wide Web) or the like. Therefore, the band of a communication circuit (line) which has been used for the conventional data communication will be narrowed, resulting in a long data communication time.

It is accordingly necessary to set up a new high-speed leased line after the abandonment of the conventional line and the peripheral system thereof so that the lead-in cost is increased burdening final users.

As a means for solving these problems, a skilled person in the art can conceive a method for making the whole including the office in the form of a wide band, as shown FIG. 23.

For example, in the office, an ATM switchboard (ATM-SW) 50 is provided having a function of LANE (LAN Emulation) such as LECS (LAN Emulation Configuration Server) 51, LES (LAN Emulation Server ) 52, BUS (Broadcast & Unknown Server) 53 and a function of MPOA such as an MPOA (Multi-Protocol Over ATM) servers 54, and leads in a personal computer PC using DS1 or ATM-25 interface (IF).

Circuits outside the office are led in a wide band public network (WB PUBLIC NW) 55 with an optical link through an ATM interface such as STS-1, DS3, or DS1, which forms a concept of B (broad band)-ISDN.

Also, as shown in FIG. 24, a skilled person in the art can conceive a method by which the data communication is carried out by using a high-speed LAN 60 in the office and by connecting the office to a wide band public network 55 outside the office with an optical link through a high-speed router 61 in the same as FIG. 23.

With regard to voice in these wide band systems, there is an idea achieved by VTOA (Voice Tele phony Over ATM) or the like.

However, in order to operate these systems, there costs a great deal of expense and remain technologically unsettled problems.

Furthermore, the public network also has a considerable difficulty in respect of technology and cost to contain the corresponding system, requiring a long term for the achievement.

Furthermore, it is necessary to abandon an existing system (such as a LAN system, a PBX, lead-in circuits, and a voice switchboard as well as the communication network on the public network side) or to invalidate the utilization for the system change.

Therefore, at the moment, those systems are impractical for a number of offices except big enterprises having a huge capital.

On the other hand, an internet telephone has been recently paid to attention as an art which transfers voice by incorporating a telephone in a personal computer to use an existing data communications system. As shown in FIG. 25, this art is to transfer voice data by using the protocol of TCP/IP for the internet where a connectionless UDP is actually used so that adverse effects on the existing system are little.

However, it is also necessary to set up a LAN system connected to the internet network 14 through an IP router 62 or the like to support the protocol of TCP/IP. In addition, the relay/DSP conversion process in a voice codec (CODEC) is mostly carried out by a processor ($\mu$ P), and therefore the personal computer is required to have a high-speed processor.

Moreover, the call quality depends on the status of data traffic in the internet network, and is not necessarily good as the evaluation is various. Because of the jammed condition caused, a condition may occur where the call is difficult to be made.

In any case, the internet telephone is poor concerning traffic managements in comparison with the conventional public telephone network while it is effective for a simple voice communication system. It is expected that a long term is required for the improvement including the solution of a basic problem.

SUMMARY OF THE INVENTION

It is accordingly an object of the present invention to provide an integrated communication system of voice and data which connects an Ethernet LAN to an external network by using a conventional communication system used so far.

For the achievement of the above object, an integrated communication system of voice and data according to the present invention comprises; a personal computer connected to the LAN and having an interface stored therein for transferring a voice signal at a data link level without processors; an ISDN voice interface connected to the LAN and for connecting the personal computer to the external communication network with a voice channel; various routers for performing data communication on the LAN and having an interface with the external communication network; a multiplexer for multiplexing/demultiplexing input/output data of the ISDN voice interface and the routers in a plurality of channels; and an access network having a user interface for connecting input/output data of the multiplexer to the external communication network.

This integrated communication system of voice and data will be described referring to the schematic diagram shown in FIG. 1.

As a system on a user side, between an existing office LAN 1 and a narrow band switching network 10, a frame relay network 12, or an internet network 14 which is an existing network outside the office, an access network 8 is set up.

As for the LAN 1, a conventional Ethernet LAN, various routers, and personal computers (PC) 2 are used as they are. However, as for voice a communication channel circuit (interface) is provided in the personal computer 2 so that the voice signal may be transmitted from and received by the personal computer 2.

This voice channel circuit on the side of the personal computer 2 is adapted such that the voice signal can access the ISDN line directly connected to the LAN 1 or other personal computers at the data link level (MAC layer) without any processor in the personal computer 2, which is different from the internet telephone.

This voice channel circuit is mounted on the personal computer 2. On the LAN 1, an ISDN voice interface 3 is provided corresponding to the voice interface to make a connection with an external ISDN network.

Also, the data on the LAN 1 is connected to the external line through conventional routers.

The conventional routers 6 include an ISDN router 4 which makes a call connection with the public ISDN circuit when a communication demand is generated, a router 5 having a frame relay interface fixedly connected to other routers, and a router 6 having a cell relay (ATM) interface for a high-speed data communication. These routers may comprise a server.

The data comprising ISDN data, frame relay data, and cell relay data is multiplexed by a multiplexer 7 such as an ADSL multiplexer using e.g. an ADSL (Asymmetric Digital Subscriber Line) art utilizing a conventional 2-wire line, and then transmitted to the access network 8.

In this access network 8, the above-noted user interfaces such as the ISDN voice interface 3 and the routers 4–6 are connected to the conventional networks 10, 12, and 14 by utilizing the PVC (Permanent Virtual Circuit) function of the frame relay or the cell relay and TDM leased lines 11, 13.

The access network 8 is composed of an access unit connected to users by means of the ADSL, and a relay node group which leads in the access unit and forms a high-speed leased line network where a high-speed optical lines are connected on a ring.

The above-noted personal computer, the ISDN voice interface, and the routers may designate an arrival or destination address with an IP address.

Also, the personal computer and the ISDN voice interface may have means for controlling a synchronization and an abandoned frame of data in a voiceless condition.

Also, the access unit may include an interface connected to the ISDN network, the frame relay network, or the cell relay network as the external network through the high-speed leased line network.

Furthermore, a network management system may preferably be provided which sets a PVC path of the frame relay, the PVC path of the cell relay, and various parameters in the frame relay and the cell relay through the high-speed leased line network.

Furthermore, this integrated communication system of voice and data may be realized which is connected to an Ethernet LAN and includes an interface for voice signal transmission and reception at a data link level without any processor regardless of any connection with the above-noted external network.

BRIEF DESCRIPTION OF THE DRAWINGS

Throughout the figures, like reference numerals indicate like or corresponding components.

DESCRIPTION OF THE EMBODIMENTS

Figure 1:
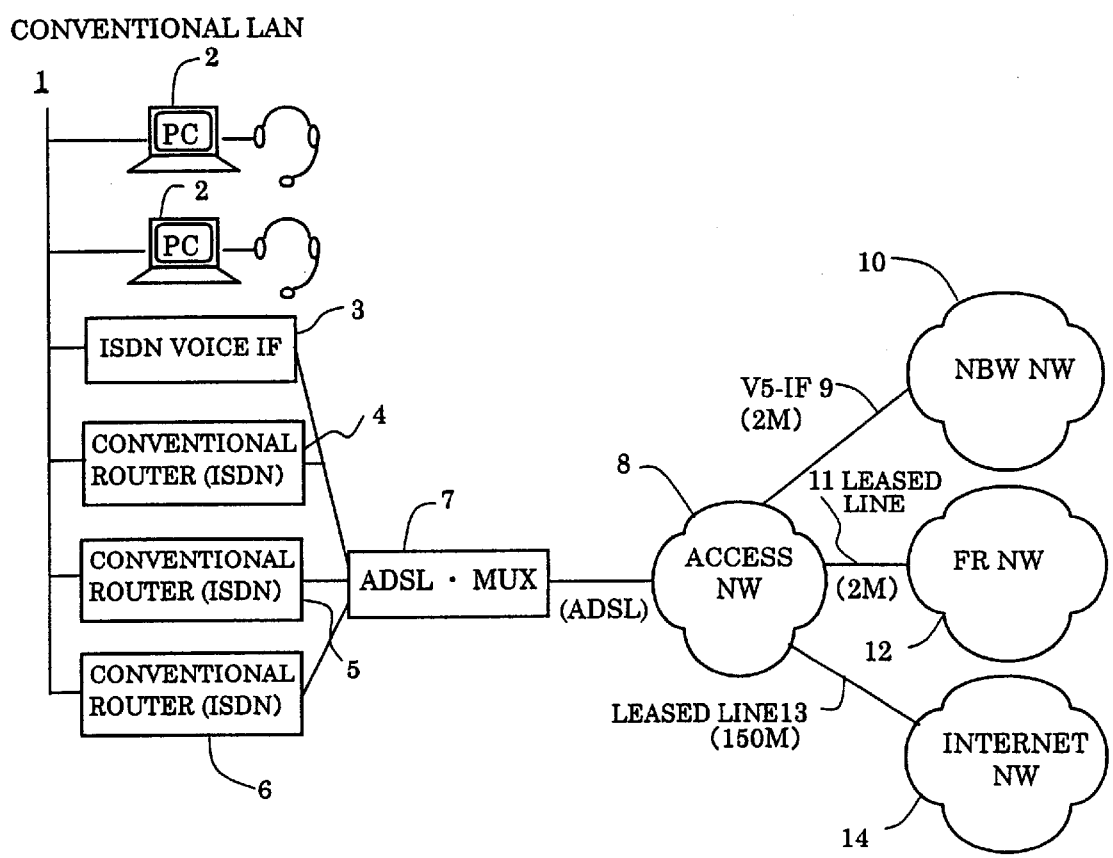
FIG. 1 is a schematic block diagram showing an integrated communication system of voice and data according to the present invention.
Figure 2:
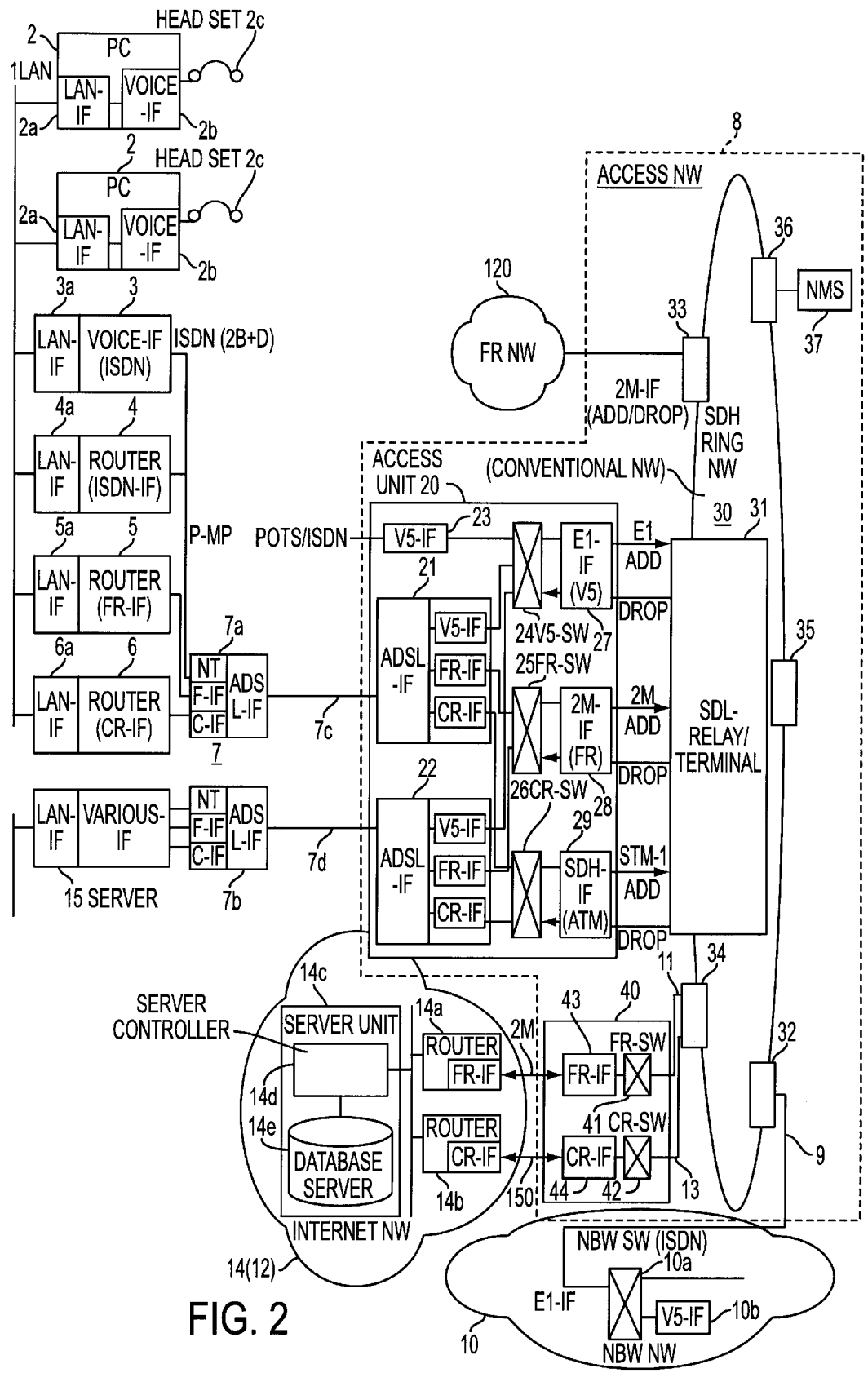
FIG. 2 is a block diagram showing one embodiment of an integrated communication system of voice and data according to the present invention.

FIG. 2 shows one embodiment of an integrated communication system of voice and data according to the present invention schematically shown in FIG. 1. In this embodiment, the personal computer 2 has a LAN interface (F) 2a as a LAN interface printed board (Ethernet), a voice interface 2b and a head set 2c.

The ISDN voice interface 3 and the routers 4–6 are provided with LAN interfaces 3a–6a respectively for the connection with the Ethernet LAN 1. Among these interfaces, the ISDN voice interface 3 and the router 4 are connected to a network terminal NT installed in CNU (Coppered Network Unit) 7a forming the multiplexer 7 in accordance with a method of "point to multi-point".

The interface 3 and the router 4 notify data transmission/reception to the personal computer 2 with a usual data communication protocol such as TCP/IP, and make transmission/reception process (Q.931) at D-ch as ISDN terminal equipments to external lines.

In addition, various servers 15 are connected to the LAN 1 and also provided with a CNU 7b. The CNUs 7a, 7b are connected to user interfaces 21, 22 in an access unit 20 forming a part of the access network 8 through ADSL wire lines 7c, 7d connected to ADSL interfaces (ADSL-IF), respectively.

In the access unit 20, the user interfaces 21, 22 both have the ADSL interfaces on the side of the multiplexer 7, and an ISDN voice interface V5-IF, a frame relay interface FR-IF, and a cell relay interface CR-IF on the side of the network. Also, a voice interface (V5-IF) 23 is provided for a telephone (POTS/ISDN).

Also in the access unit 20, homogeneous interfaces are connected to homogeneous switchboards (SW). Namely, the voice interface V5-IF is connected to an ISDN switchboard (V5-SW) 24, the frame relay interface (FR-IF) a frame relay switchboard (FR-SW) 25, and the cell relay interface (CR-IF) a cell relay switchboard (CR-SW) 26, respectively.

Moreover, the access unit 20, interfaces 27–29 are provided to add/drop the input/output signals of the switchboards 24–26 to/from a relay node 31 forming a part of an existing SDH ring network 30.

The ring network 30 additionally includes nodes 32–36. To the node 32 is connected the narrow band network 10 having a narrow band switchboard 10a and the interface V5-IF. To the node 33 is connected the frame relay network 12. To the node 34 is connected the internet network 14 through an access unit 40.

This ring network 30 is an existing high-speed leased line network composed of a high-speed optical circuit, and a relay node which functions as a crossconnect to the optical circuit at the level of E1 channel (2M) and STM-1 and adds/drops a signal to/from the access units 20, 40 at the level of E1 channel (2M) and STM-1.

The access unit 40 is composed of a switchboard (FR-SW) 41, cell relay switchboard (CR-SW) 42, a frame relay interface (FR-IF) 43, cell relay interface (CR-IF) 44, corresponding to the access unit 20. The internet network 14 is connected to various server units 14c through routers 14a, 14b. Each of the server units 14c includes a server controller 14d and a data base server 14e.

To the node 36 is connected a network management system (NMS) 37 conducting the whole operation management of the ring network 30.

In operation of the embodiment having the above arrangement, a voice signal transmitted from the personal computers 2 through the LAN 1 is led in the access unit 20 through the ISDN voice interface 3 and the CNU 7a. In the access unit 20, a V5 system which is composed of the interface (V5-IF) 23 and the switchboard (V5-SW) 24 and the interface (E1-IF) 27 and forms a remote concentrator under the control of the switchboard is connected to an ISDN switchboard in the narrow band network 10 through the high-speed leased line network 30.

The frame relay interface FR-IF 28 enables the data communication to be connected between the router 5 and another frame relay router 14a through the CNU 7a, the frame relay switchboard 25 installed in the access unit 20, and the high-speed leased line network 30. Also, the frame relay interface FR-IF can be connected to another existing frame relay network 120.

Also, the cell relay (ATM) interface 29 enables the data communication to be connected between the router 6 and another cell relay router 14b through the CNU 7a, the cell relay switchboard (only PVC) 26 installed in the access unit 20, and the high-speed leased line network 30. This cell relay interface 29 can also be connected to an internet service provider having such a cell relay interface.

As above-described, the interface between the LAN users and the access unit 20 enables signals to be transferred by the combination of an ISDN interface which is a voice ISDN circuit or an existing router, a frame relay, or a cell relay (ATM) which is a new high-speed router interface, so that the ADSL art previously specified by ANSI is utilized.

This ADSL art is a multiplexing art for a high-speed communication which puts the signals on existing wire pair lines for telephone. For the realization of this ADSL communication, ADSL interfaces (ADSL-IF) are installed in the access unit 20 on the side of the network 30 and in the multiplexer 7 on the side of the users, respectively.

Figure 3:
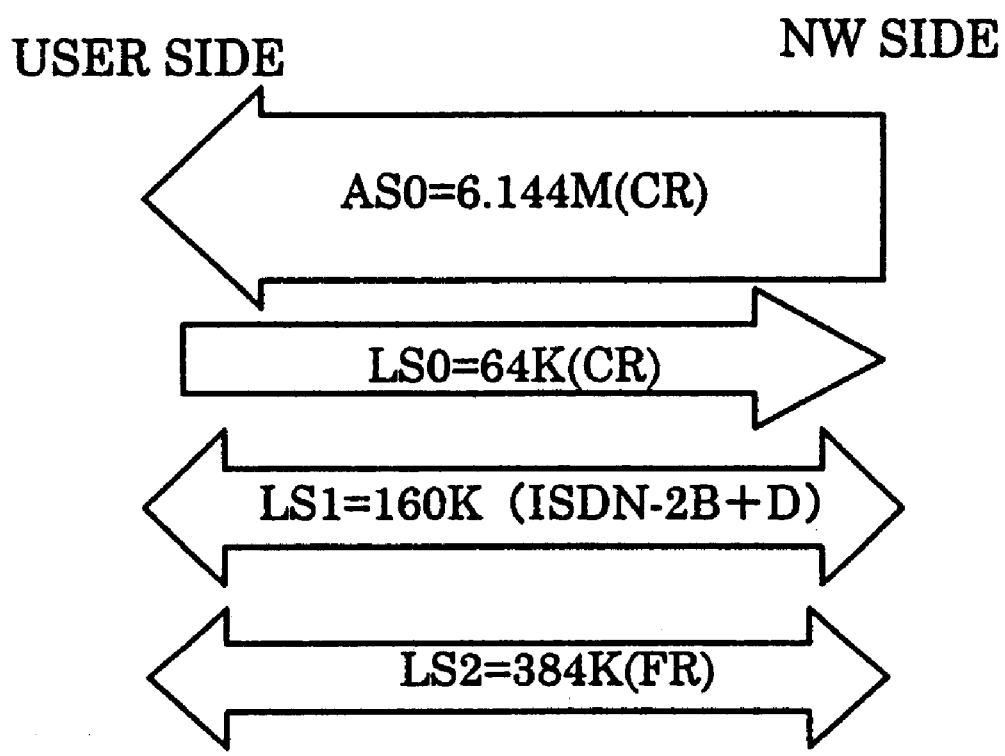
FIG. 3 is a diagram showing an example of band assignment in an ADSL multiplexer used in an integrated communication system of voice and data according to the present invention.

It is prescribed by this ADSL art that up-loading and downloading transmission speeds (rates) are 600K and 6M, respectively which are asynchronous maximum values. The multiplexing function of plural ADSL channels are also prescribed. In this embodiment as shown in FIG. 3, the up-loading/down-loading speeds for ISDN are both assigned to 160K, those for the frame relay 384K, and those for the cell relay 64K and 6.144M, respectively.

By the above system arrangement, it is made possible that the existing LAN 1 is utilized for the voice communication in a usual business on the user side to suppress the PBX to have the minimum required circuits for emergency or the like, resulting in a very small size. Also, telephones on desks can be eliminated by storing the telephone circuit within the personal computer 2.

Furthermore, for the connection of voice to the external lines, the voice ISDN interface 3 can be connected to the LAN 1 so that the voice communication on the LAN 1 can be taken out to the public network 10. By a multi-channel communication in the ADSL multiplexer 7, the conventional circuits are effectively available. The connection from the users to the conventional network by utilizing the access unit 20 and the high-speed leased line network 30 enables the conventional network system to be effectively used without a large modification.

Also, such a system arrangement can exclude a drastic system modification when a user desires to have a higher speed communication to reduce the investment risk.

Figure 4:
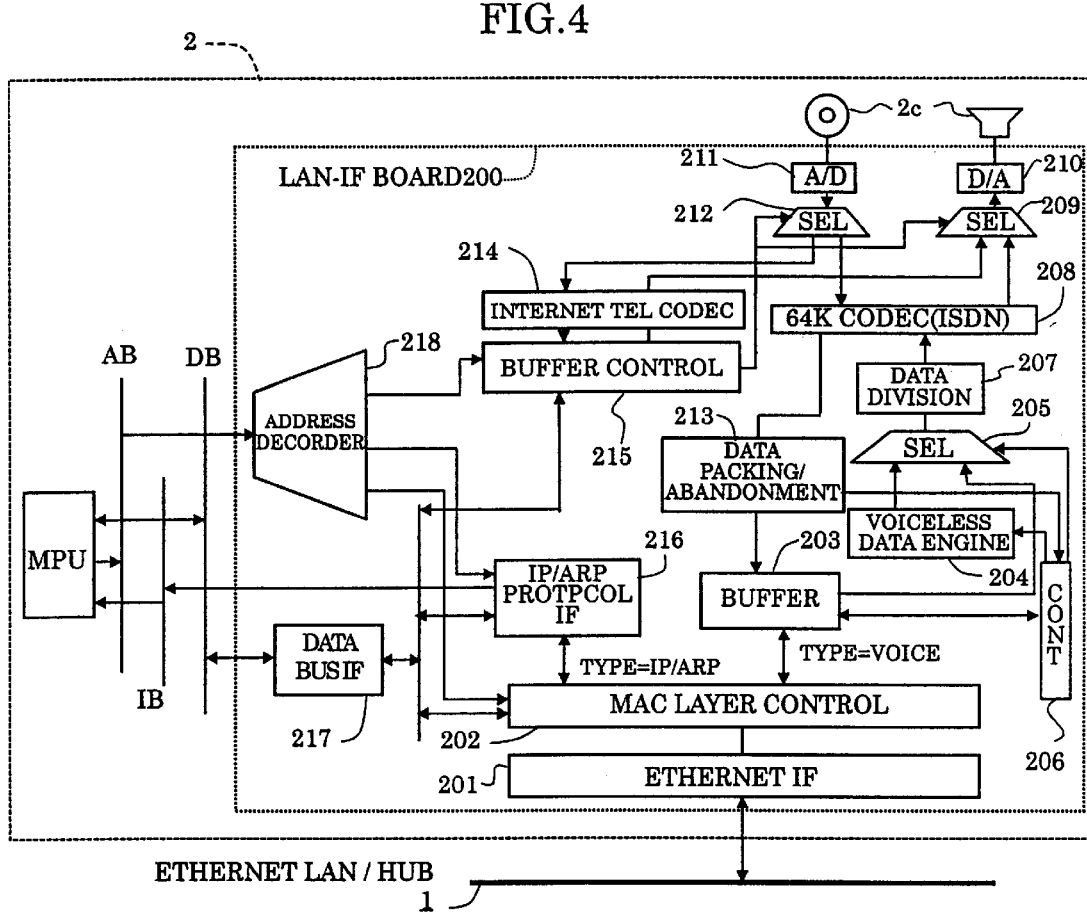
FIG. 4 is a block diagram showing a hardware arrangement of a personal computer used in an integrated communication system of voice and data according to the present invention.

FIG. 4 shows a hardware arrangement of the personal computer 2 having a voice interface stored therein. In this arrangement, the voice interface is stored in a LAN interface board 200.

In this LAN interface board 200, to the LAN 1 is connected a MAC layer controller 202 through an Ethernet interface 201. The MAC layer controller 202 discriminates voice data and usual data depending on "type". In the former case, the MAC layer controller 202 is connected to a voice data transmission/reception buffer 203. The voice data of the buffer 203 and voiceless data from a voiceless data engine 204 are provided for a selector (SEL) 205.

The selector 205 is controlled by a controller 206 which monitors the data of the buffer 203 and outputs the data to a CODEC 208 through a data divider 207. The output data of the CODEC 208 is provided for the receiver of the head set 2c through a selector 209 and a D/A converter 210. The transmitter of the head set 2c outputs the signal to the CODEC 208 through an A/D converter 211 and a selector 212, and then to the buffer 203 from a data packing/voiceless data abandoning portion 213.

This LAN interface board 200 pays attention to an interface of the internet telephone which has recently become popular. A CODEC 214 for the internet telephone is connected to the other input terminals of the selectors 209, 212 which are connected to a voice data transmission/reception buffer controller 215 to monitor the input/output data of the CODEC 214 to control the change-over operation of the selectors 209,212.

In the case of usual data, the MAC layer controller 202 is connected to a microprocessor MPU through an IP/ARP (Address Resolution Protocol) interface 216 and an interrupt bus IB, and through a PC internal data bus interface 217 and a data bus DB. The microprocessor MPU provides an address signal for the MAC layer controller 202, the voice data buffer controller 215, and the IP/ARP protocol interface 216 through an address bus AB and an address decoder 218.

In operation, the voice data input from the LAN 1 via the Ethernet interface 201 and MAC layer controller 202 has the band of 64K ($\mu$ row, Arow) in view of the connection with the ISDN public circuit. The voice data is put on the LAN 1 in combination of 62 bytes.

In the case that the data contents of 62 bytes have a voiceless pattern, the voiceless data abandoning portion 213 abandons the data not to be transferred. Upon the reception time, the voiceless pattern is forcibly generated by the voiceless data engine 204 when no voice data is given within a prescribed time interval. This results in a reduced voice data on the LAN 1 and a reduced load on the LAN bus.

A destination to be notified is designated by a destination IP address in the office. However, in the presence of DNS like a conventional LAN service, the IP address is acknowledged through a DMS server. The microprocessor MPU acknowledges the MAC address of the destination by means of ARP of TCP/IP from the destination IP address, and stores it.

On the other hand, outside the office, the destination can be acknowledged with the telephone number. In this case, the MAC address of the ISDN voice interface is designated by the microprocessor MPU. In the ISDN signaling, required information is notified by the TCP/IP protocol between the user's personal computers and the ISDN voice interface, and then to the public network from the ISDN voice interface by Q.931 protocol.

Figure 5:
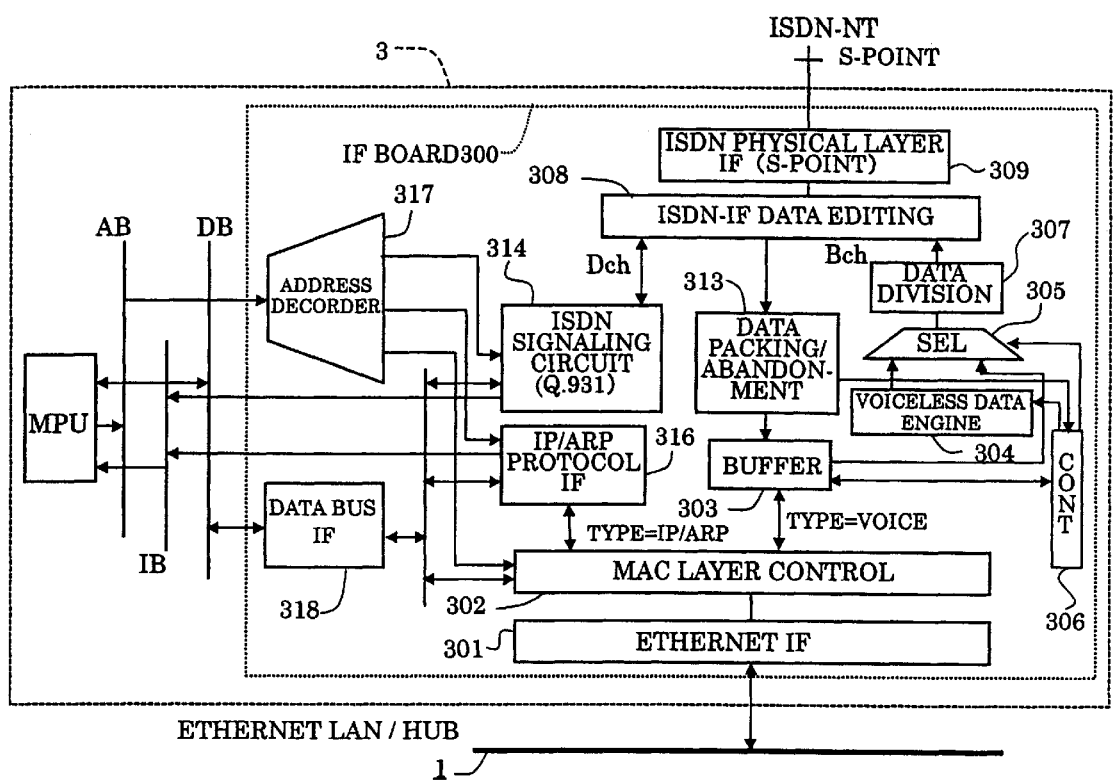
FIG. 5 is a block diagram showing a hardware arrangement of an ISDN voice interface server used in an integrated communication system of voice and data according to the present invention.

A specific arrangement of the ISDN voice interface 3 shown in FIG. 1 and 2 is shown in FIG. 5. While this interface3 is similar to the LAN interface board 200 shown in FIG. 4 with regard to the interface or the voiceless data process on the side of the LAN 1, an ISDN interface of the public network is added as a different component.

Namely, upon data arrival, it is necessary to transfer the voice data transmitted from the personal computer 2 after that process when the voice data includes a voiceless condition. Upon data transmission, a proper signaling process for ISDN is required.

Specifically, instead of the CODEC 208, the selectors 209, 212 and the converters 210, 211 in FIG. 4, an ISDN interface data editing portion 308 and an ISDN physical layer interface 309 are provided for the connection with the multiplexer 7 (see FIGS. 1 and 2). Also instead of the internet telephone CODEC 214 and the buffer controller 216, an ISDN signaling control circuit 314 is provided.

For the data transmission, necessary information such as a destination telephone number designated by the microprocessor MPU is designated through TCP/IP. After the ISDN signaling controlling circuit 314 makes a connection with the destination by the ISDN signaling process of Q.931 of the server, the voice data is relayed through the MAC layer controller 302 on the LAN side and the ISDN-B-ch editing portion 308 on the network side.

For the data arrival, each of the personal computers 2 under the server is provided with a sub-address of the ISDN telephone number. The server has preliminarily registered the correspondence chart between the sub-address and the IP address in the microprocessor MPU. From this sub-address the IP address is acknowledged, and the MAC address is acknowledged by an IP/ARP protocol interface 316 to designate the arrival personal computer, thereby notifying the signal arrival to the personal computers so that voice data communication is carried out after the personal computers have responded.

In the absence of the arrival response for a fixed time interval or in the case of impossible communication, the poll to the personal computers is discontinued and the arrival destination is shifted to other personal computers with a different sub-address. With respect to the signal arrival without any sub-address, the arrival destination is to be a preliminarily registered personal computer.

Figure 6:
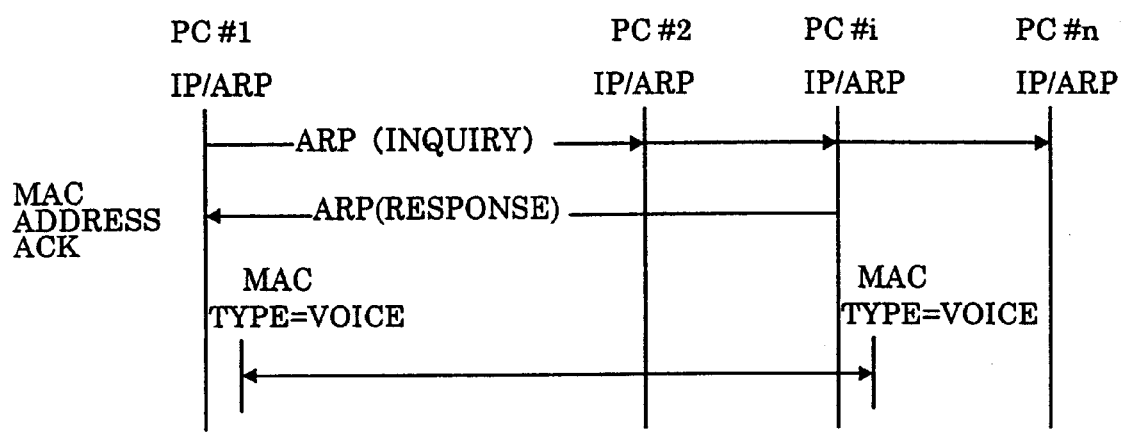
FIG. 6 is a sequence diagram showing an example of communication process protocol between personal computers used in an integrated communication system of voice and data according to the present invention.

In FIG. 6, is shown a protocol procedure of the ARP process for deriving the MAC address from the IP address by the IP/ARP protocol interfaces 216, 316 between personal computers or between a personal computer and the ISDN voice interface 3. The ARP function is a protocol in which an inquiry packet of the MAC address is notified to all of the user's personal computers PC#1–#n on the LAN 1 by a multi-casting method and the user's personal computers having the corresponding IP address respond to the original user's personal computers of the inquiry packet with accompanying the MAC address. This ARP function is installed as a standard in the LAN of TCP/IP.

Figure 7:
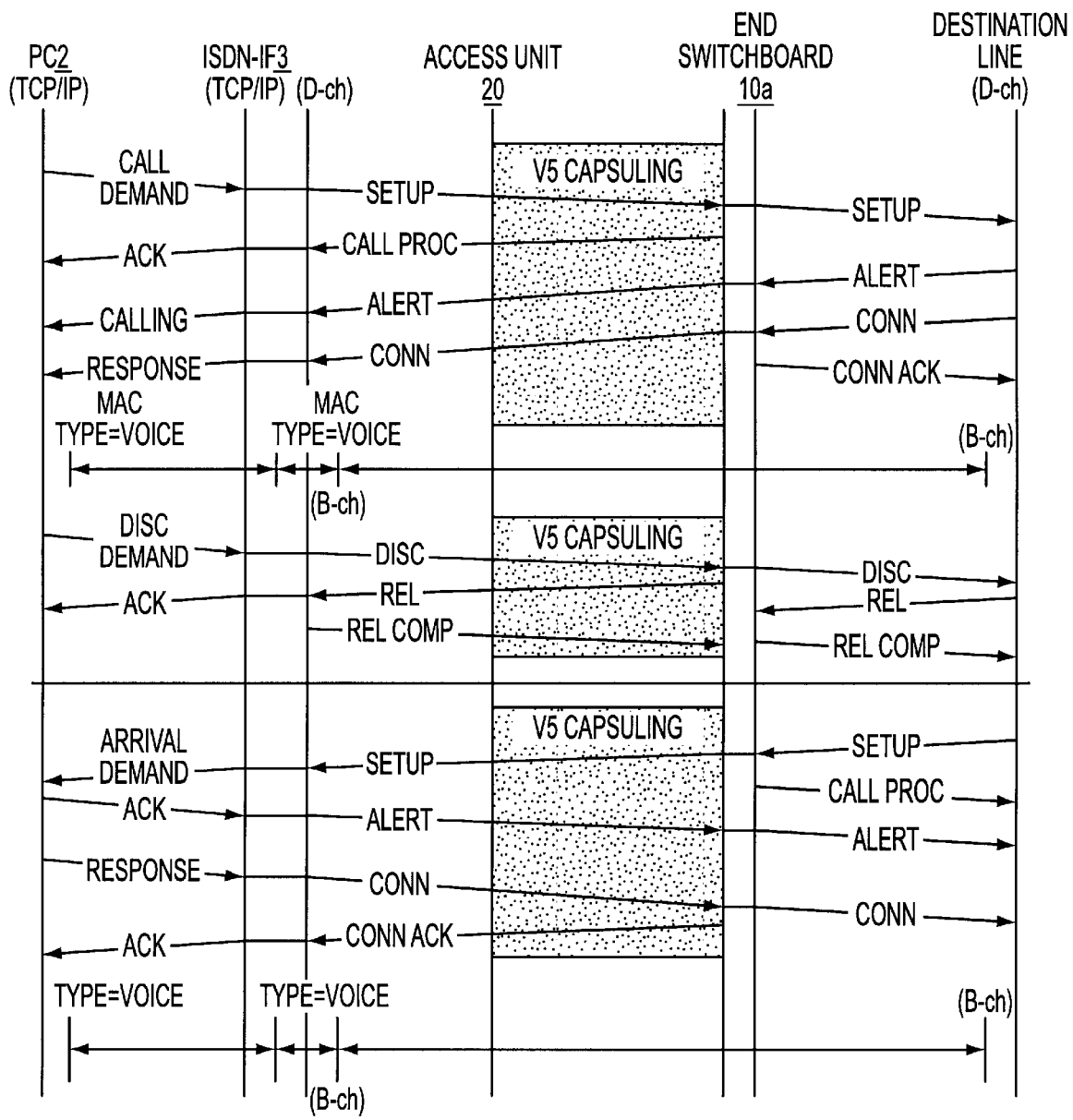
FIG. 7 is a sequence diagram showing an example of external communication process protocol in an integrated communication system of voice and data according to the present invention.

FIG. 7 shows a sequence example of a transmission/reception protocol from the above-noted personal computers 2 to the ISDN public network 10. Between the personal computers 2 and the ISDN voice interface 3, data communication is made by using "Call demand", "CONN ACK (connection acknowledge), "call proc (process)", "response", "DISC (disconnection) demand", and "arrival demand" according to the protocol of TCP/IP.

The ISDN voice interface 3 functions as an ISDN terminal adapter on the side of the public network, and forms a multi-port link with another ISDN router 4 if any. A signaling communication is made by Q.931 protocol through ISDN-Dch such as "setup", "call proc", "alert", "conn", "disc", and "rel". After the connection with the destination terminal equipment, B-ch voice data communication is made. On the way between the access unit 20 and the end switchboard 10a, a capsuling operation shown by a meshed portion is performed by the V5 protocol.

Figure 8:
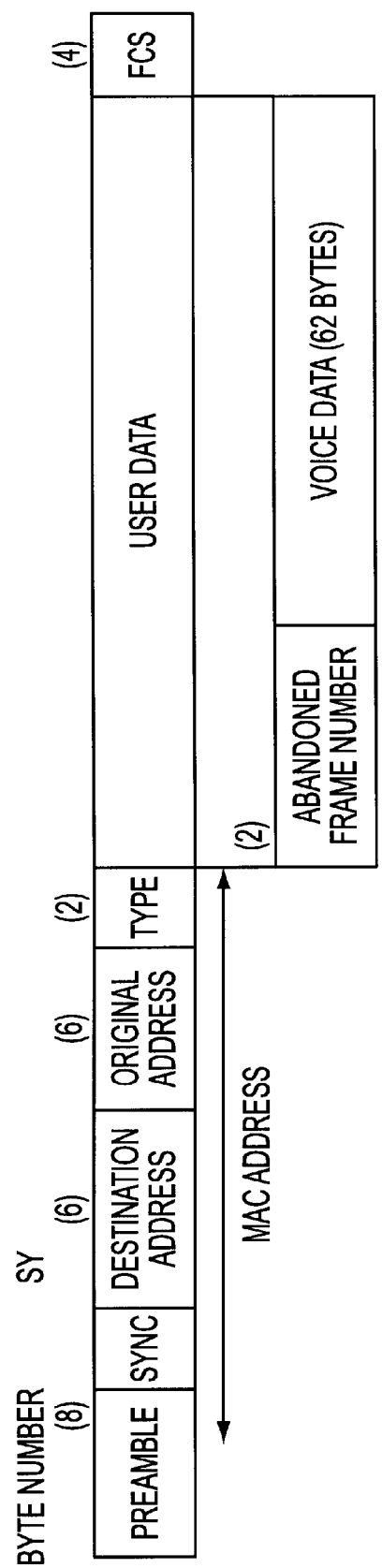
FIG. 8 is a format diagram showing an example of voice data on an Ethernet LAN (DIX Ethernet protocol) in an integrated communication system of voice and data according to the present invention.

The format of the voice data on the LAN 1 will now be described referring to FIG. 8.

The LAN 1 is assumed to be an Ethernet LAN of the DIX type adopted by a large number of LAN makers. The header portion of the Ethernet data is composed of a preamble, a synchronization portion, and a portion of the MAC address as well as a portion of the above-noted "type" data of 2 bytes.

The significant protocol is designated by the "type" such as IP or ARP. One of empty codes other than generally known codes as the "type" such as IP=0800, ARP=0806, SNA=80D5 is assigned as the one for the voice data communication. The voice data is transferred on the Ethernet LAN with the addition of the code.

Having received data from the LAN 1, the MAC layer controller 202 in the LAN interface board 200 of each user reads the type code in the form of hardware, and transfers the data to the buffer 203 from the voice processing port in the case of voice data type. On the contrary, as for the data transfer demand from the voice processing port, a type code for voice data in addition to the own/destination MAC address is set and transferred.

The contents of the data are formed of an abandoned frame number of 2 bytes and voice data of 62 bytes. The quantity of the voice data is changed depending on a relationship between an average frame queuing time and a voice delay time upon the collision of the data. The abandoned frame number indicates how many voice data frames have been abandoned just before the voice data frame which is now being transferred. As a cause the abandoned frame is generated, the above-noted voiceless data is cited. If a voiceless condition is going to be generated exceeding the maximum value of the abandoned frame number, the voiceless data of 62 bytes is transmitted before the generation of the event.

The abandoned frame is controlled by the controllers 206, 306 which monitors the voice data transmission/reception buffers 203, 303.

The processing method of the abandoned frame number will be described referring to FIG. 9–12.

Figure 9:
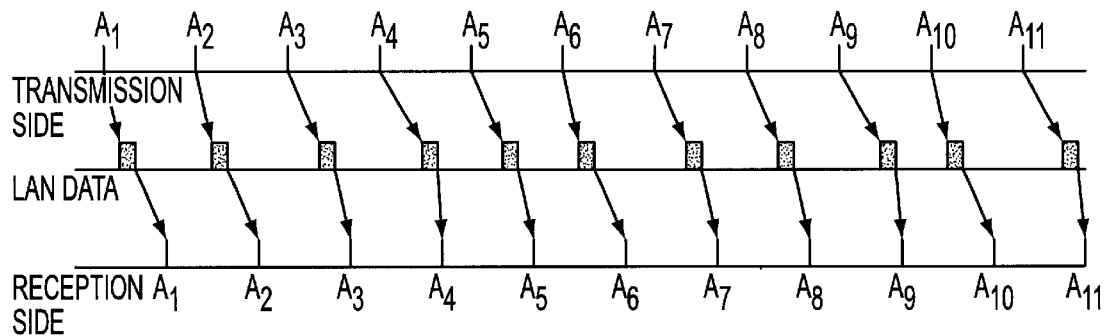
FIG. 9 is a time chart of a communication example of normal voice data on an Ethernet LAN in an integrated communication system of voice and data according to the present invention.
Figure 10:
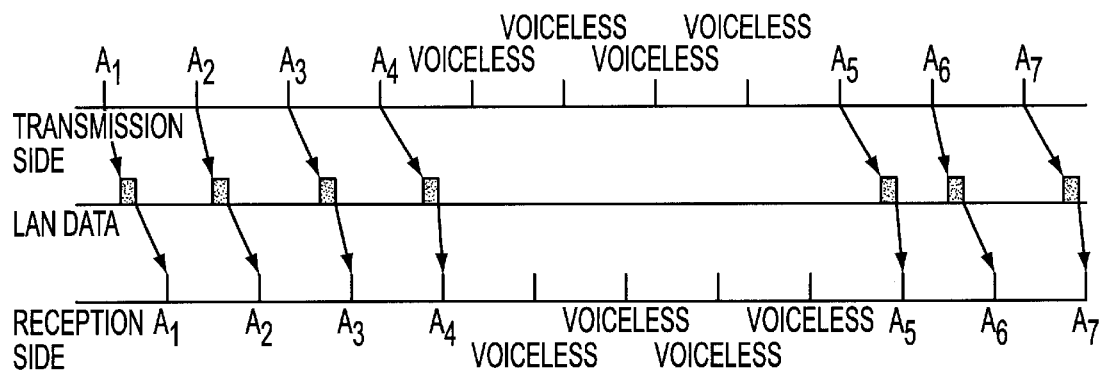
FIG. 10 is a time chart showing a communication example of voice data on an Ethernet LAN upon occurrence of a voiceless condition in an integrated communication system of voice and data according to the present invention.
Figure 11:
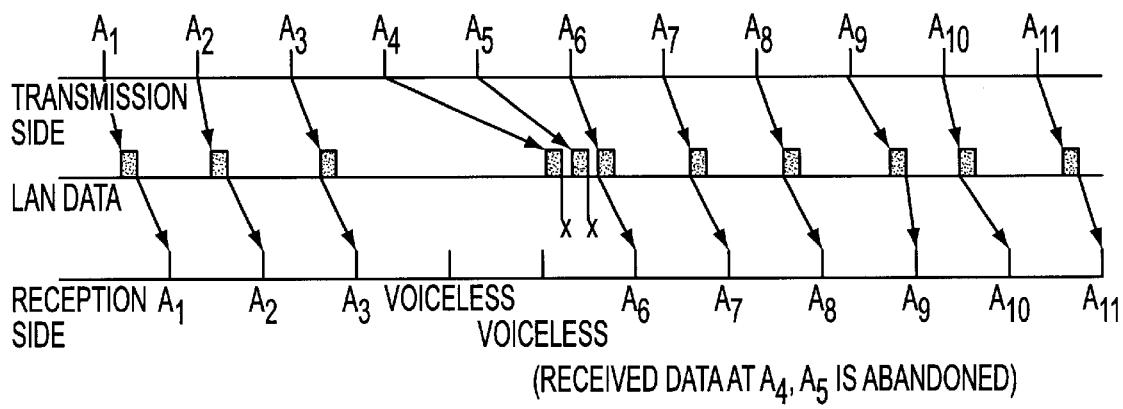
FIG. 11 is a time chart showing a communication example of voice data upon occurrence of delay on an Ethernet LAN in an integrated communication system of voice and data according to the present invention.

While voice is being transferred in a normal conversation, it is possible to make a communication both on the transmission and reception sides without any generation of miss-synchronization as shown in FIG. 9. However, when the voiceless condition is generated on the way, the data is not transmitted while on the reception side a miss-synchronization is generated because no voice data is received. In this case, the voiceless data engines 204, 304 generate voiceless data in synchronization with the reception side (see FIG. 10).

When the voice data is transmitted again on the transmission side, the abandoned data frame number just before the transmission is set. On the reception side, the voiceless data frame number generated by itself is compared with the abandoned data frame number. If it is found that the former is equal to or less than the latter the next reception data frame is processed as the voice data frame without any change (see FIG. 11).

Figure 12:
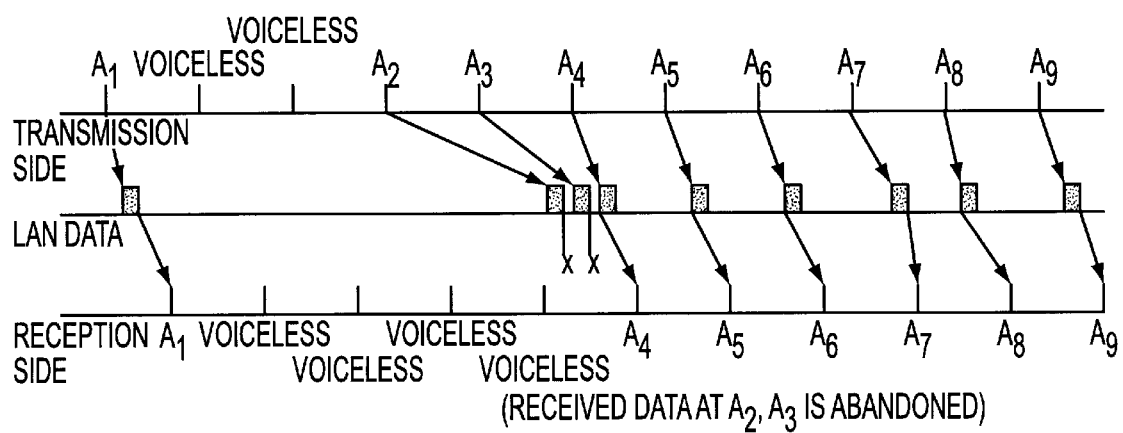
FIG. 12 is a time chart showing a communication example of voice data upon simultaneous occurrence of a voiceless condition and a jammed condition on an Ethernet LAN in an integrated communication system of voice and data according to the present invention.

However, if it is found that the former is larger than the latter, by only the difference of both, reception data frames after the abandonment is processed as voice (see FIG. 12).

This is a case where the transmitted voice data frame has been waited for a long time so that the synchronization of transmission/reception is missed for a reason such as a simultaneous generation of the voiceless data and a traffic jam on the Ethernet LAN. This is because for the voiceless data frames generated due to the miss-synchronization on the reception side it is necessary to exclude the reception data except the voiceless data quantity acknowledged on the transmission side.

Figure 13A:
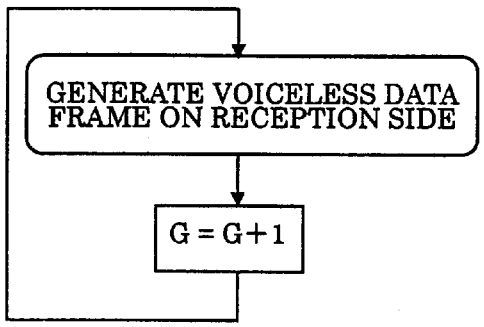
FIG. 13 is a flow chart showing frame receiving processes of voice data in an integrated communication system of voice and data according to the present invention.
Figure 13B:
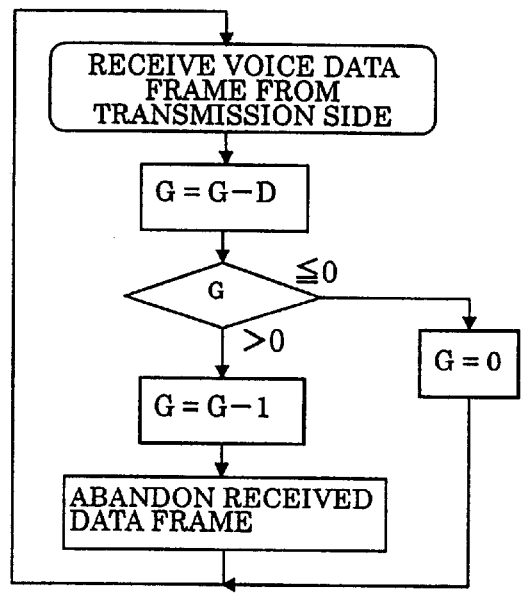

The procedure upon the reception of the voice data for realizing the above-noted process is shown in FIG. 13. This process is realized by the controllers 206, 306, the voiceless data engines 204, 304, the selectors 205,305, and voiceless data abandoning portions 213, 313.

Figure 14:
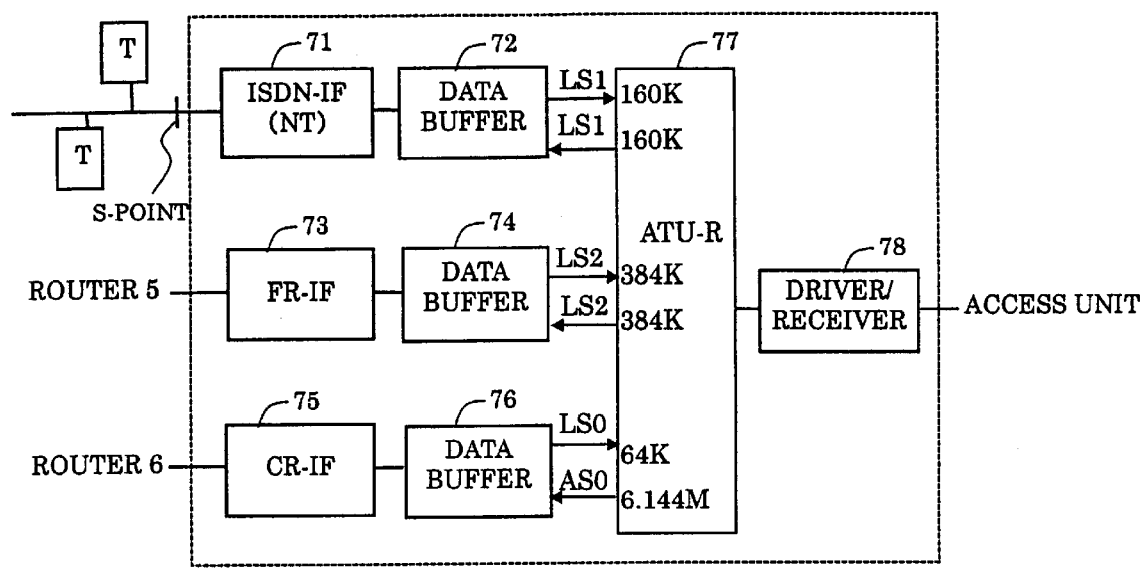
FIG. 14 is a block diagram showing an arrangement of an ADSL multiplexer used in an integrated communication system of voice and data according to the present invention.

An embodiment of the CNUs 7a, 7b (see FIG. 2) as a multiplexer installed on the user side will now be described referring to FIG. 14.

The CNUs 7a, 7b are connected to the ISDN voice interface 3 and the routers 4–6, and employ the ADSL multiplexing art for combining a plurality of channels into a single line. The ADSL art can transmit data with the maximum band of 600K on the up-loading side and 6M on the down-loading side by using a conventional POTS line as it is.

Specifically, as previously shown in FIG. 3, the multiplexing function of plural ADSL channels are also prescribed in this embodiment, the up-loading/down-loading speeds for ISDN are both assigned to 160K, those for the frame relay both 384K, and those for the cell relay 64K and 6.144M, respectively. However, this band assignment will change according to the system demand.

In the NCU, an interface 71 of ISDN-NT is mounted on the user side of the ISDN circuit. In this case, it should be considered that the interface 71 is connected to the ISDN voice interface 3 or the ISDN router 4 as a terminal equipment TE. The interface 71 is connected to an ADSL transceiver unit (ATU-R) 77 through a synchronizing transmission/reception data buffer 72. Similarly, a frame relay data communication interface (FR-IF) 73 connected to the frame relay router 5 and a data buffer 74 are connected to the transceiver unit 77.

Also, a cell relay data communication interface (CR-IF) 75 connected to the cell relay router 6 are connected to the transceiver unit 77 through a data buffer 76. The transceiver unit 77 is connected to the access unit 20 through a driver/receiver 78.

Figure 15:
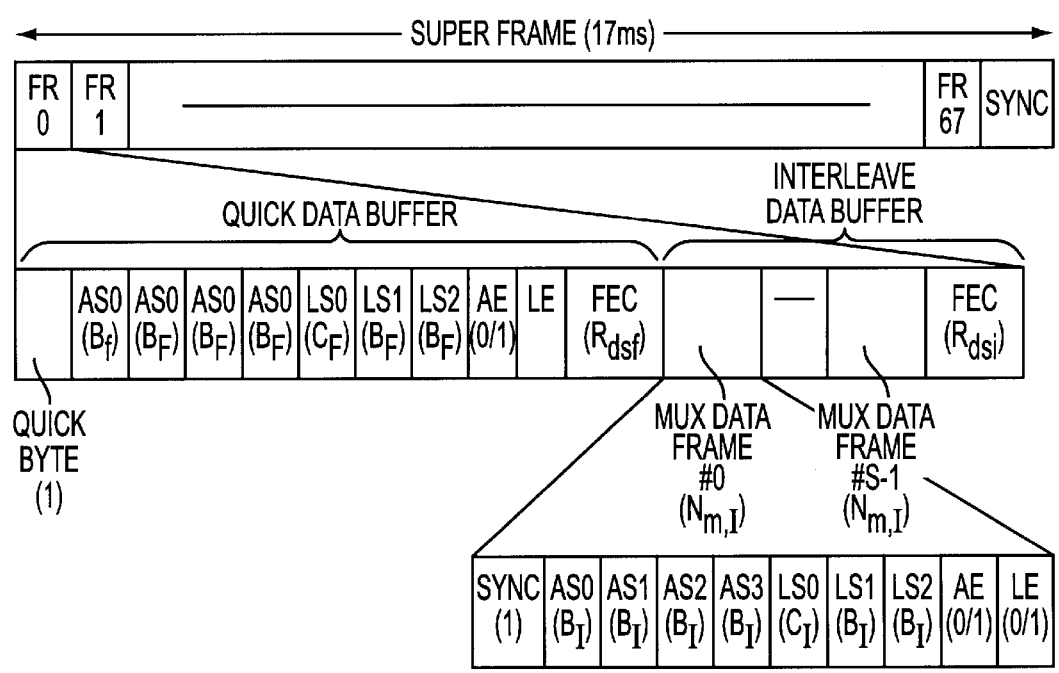
FIG. 15 is a format diagram showing ADSL data on a down-loading side used in an integrated communication system of voice and data according to the present invention.

FIG. 15 shows an ADSL specification on the down-loading side for user's multi-channel formation prescribed by ANSI. This super-frame is composed of 69 sub-frames each of which includes two kinds of data buffer portions, that is a quick data buffer portion reduced in delayed time and an interleaved data buffer portion with data guarantee being intensified against burst noises.

Although any of the data buffers may be designated in the present invention, since bytes AS1–AS3 among bytes AS0–AS3 forming the down-loading data on the up-loading side are empty in this embodiment, all of these bytes are used as a byte AS0 for enhancing the data speed.

Except such an ADSL art, if an optical link is constructed between the users (interface 3 and routers 4–6) and the access unit 20, and if a multiplexing portion, an electroloptical transducer, a separator, and an opto/electric transducer are stored both on the sides of the user and the access unit, an ONU (optical network unit) instead of the CNU can be realized having the same function.

Figure 16:
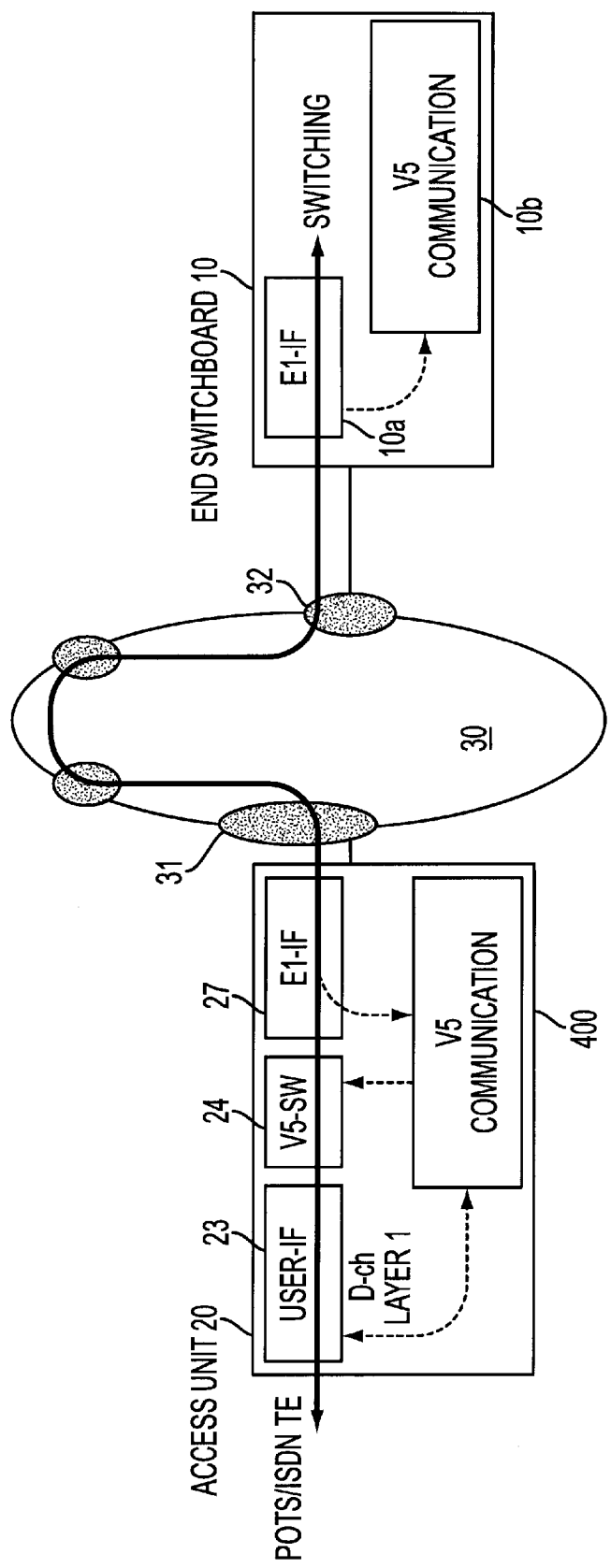
FIG. 16 is a block diagram showing an example of connection path in V5 voice system used in an integrated communication system of voice and data according to the present invention.

FIG. 16 shows a connection path example in the V5 (voice) system. The access unit 20 is composed of the interface 23, the switchboard (V5-SW) 24, and the E1 interface 27 facing the high-speed leased line network 30 for each of the users. These circuit blocks each have a control portion and are combined with the control bus. Through this control bus, information is transferred between the control portions.

The ISDN data is input from the user interface 23 as the ISDN interface. The path setting in the concentrating switchboard 24 for the subscriber line is instructed by the end switchboard 10 which terminates the V5 link. The E1 channel interface 27 as the high-speed leased line network interface is connected to the end switchboard 10 through relay nodes 31–32. The D-ch information and the layer 1 start-up information from the network terminal NT is notified to the end switchboard 10 by using the V5 channel which is assigned to a specific time slot of the E1 interface 27.

Figure 17:
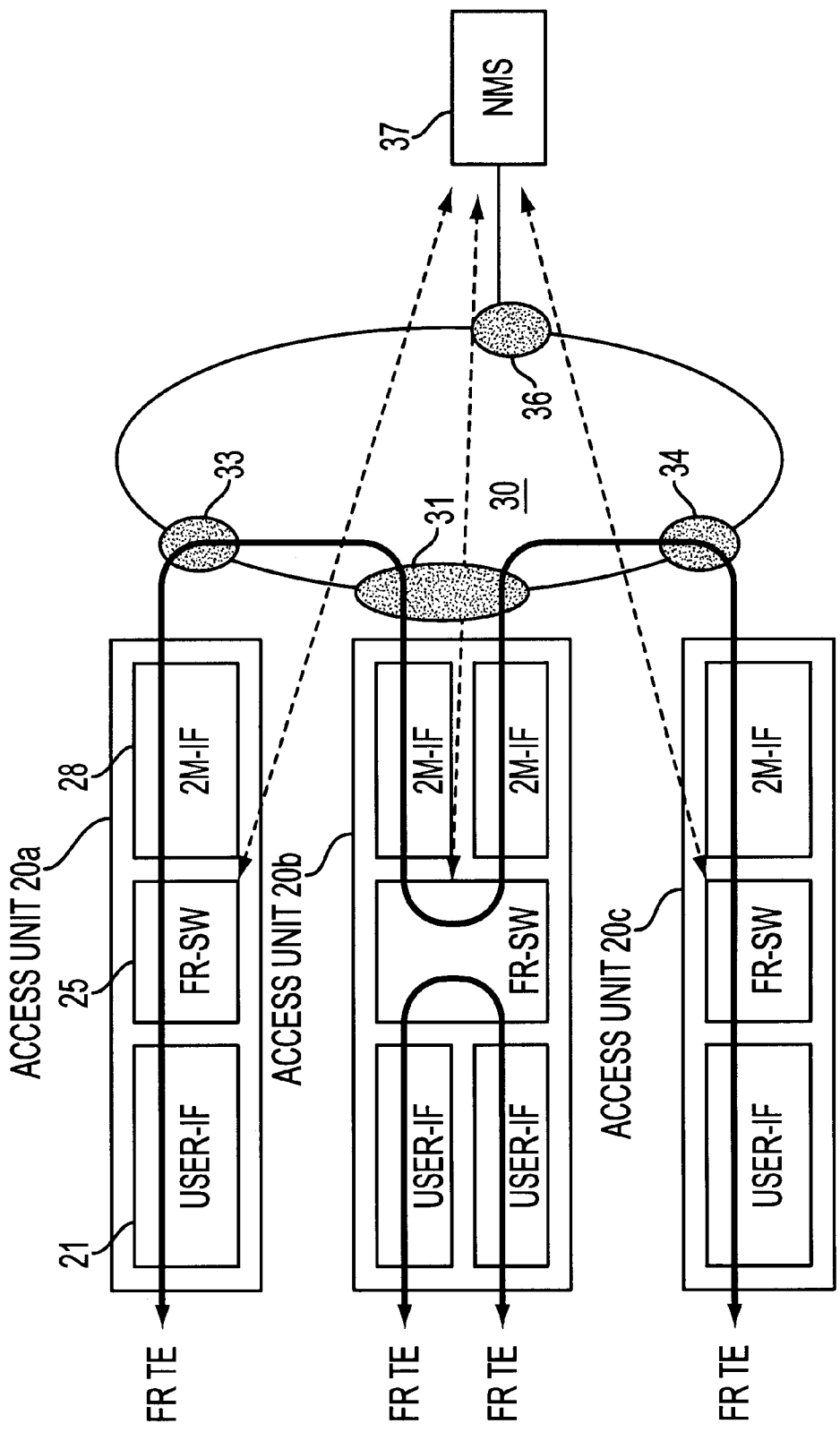
FIG. 17 is a block diagram showing an example of a connection path in a frame relay switchboard (FR-SW) used in an integrated communication system of voice and data according to the present invention.

The communication system including the frame relay terminal equipments is shown in FIG. 17, in which a switchboard (FR-SW) 25 is provided for setting the paths (PVC) of the frame relay after the traffic policing is done by the user interface 21. The paths in the switchboard 25 are selected to perform a relay operation between the user terminal equipments-the high-speed leased line network, the high-speed leased line network-the high-speed leased line network, and the user terminal equipments-user terminal equipments, as shown.

The interface with the high-speed leased line network 30 puts the frame relay data statistically multiplexed by a 2M clear channel interface 28 on the 2M line without any change. Moreover, the path setting of the switchboard or the setting of DLCI (Data Link Connection Identifier) is controlled by the network management system (NMS) 37 managing the access network in its entirety through the maintenance data communication channel (DCC) of the high-speed leased line network 30.

Traffic parameters such as CIR, Bc, Be, FECN, BECN, abandoned frame information, or the like for the users of the frame relay are also set by the network management system 37. The traffic condition such as passing frame quantity, CIR exceeding frame quantity, abandoned frame number, connection status, remaining buffer status, or the like of the frame relay is notified to the network management system 37 from the access unit 20 according to the necessity.

Therefore, even with the connection path set as shown, the frame relay data from the access unit 20a is once kept being waited by the access unit 20b depending on the traffic condition of the high-speed leased line network 30, and then transferred to the access unit 20c after the traffic quantity having been properly adjusted.

Figure 18:
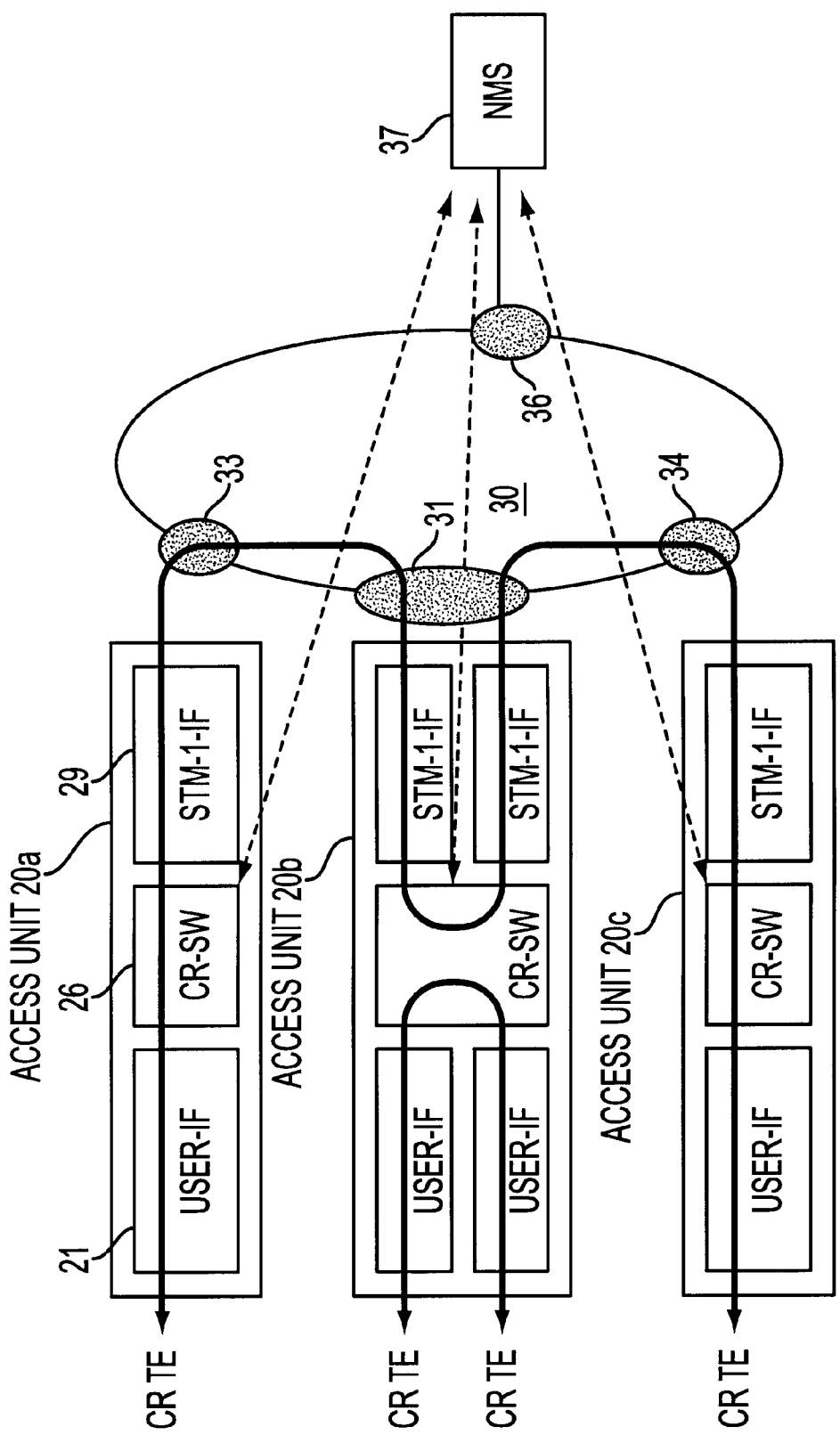
FIG. 18 is a block diagram showing an example of connection path in a cell relay switchboard (CR-SW) used in an integrated communication system of voice and data according to the present invention.

With regard to the communication system including the cell relay terminal equipments (ATM), as shown in FIG. 18, after the traffic policing by the user interface, the path setting (PVC) of the cell relay is performed by the switchboard (CR-SW) 26. The paths in the switchboard 26 are selected to perform a relay operation between the user terminal equipments-the high-speed leased line network, the high-speed leased line network-the high-speed leased line network, the user terminal equipment-the user terminal equipment, in the same as the frame relay in FIG. 17.

The interface with the high-speed leased line network 30 is made by an STM-1 interface 29 of 150M with the payload being ATM, and the ATM cell relay data statistically multiplexed by the interface 29 is put into the payload. The path setting and the VPI/VCI setting for the switchboard 29 is made by the network management system 37 through the maintenance data communication channel (DCC) of the high-speed leased line network 30 in the same as the frame relay.

Traffic parameters such as UPC (Usage Parameter Control) parameters, EFCI, abandoned cell/packet information, ABR relationship information, or the like for the users of the cell relay are set by the network management system 37. Moreover, the traffic condition of the cell relay indicated by the passing cell number (CLP=0, CLP0+1), abandoned cell number, received abnormal cell number, layer connection status, or the like is notified to the network management system from the access unit 20 according to the necessity. Also in connection with OAM controls, this system is realized by transferring the control/result information with the network management system 37.

The necessity of relay operations is the same as the case in FIG. 18.

Figure 19:
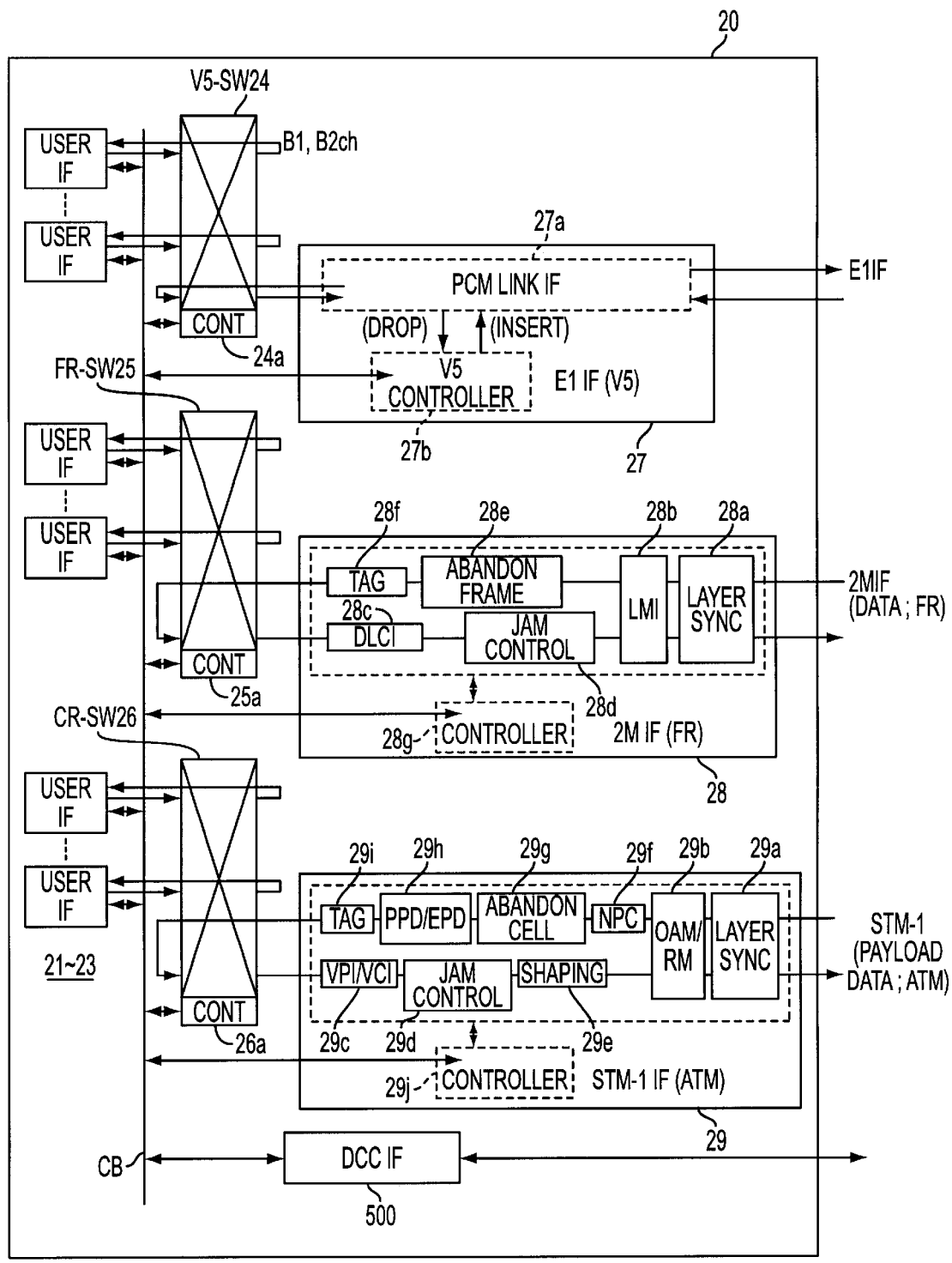
FIG. 19 is a block diagram showing an arrangement of an access unit used in an integrated communication system of voice and data according to the present invention.

FIG. 19 shows an arrangement of the access unit 20 as a whole, in which the arrangements of the interfaces 27–29 are specifically shown.

The interfaces 27–29 in the access unit 20 are connected to the network management system 37 through the high-speed leased line network 30. The control bus CB is connected to the high-speed leased line network 30 through a DCC interface 500.

To the control bus CB is connected interface boards and switching boards (controllers 24a–26a). The designation by the network management system 37 to the access unit 20 and the control boards is made by TID also used in the existing network management system 37.

Also in the E1 interface 27, a PCM link interface 27a connected to the switchboard 24 and a V5 controller 27b connected to the control bus CB are provided to control such that the ISDN voice data from the switching board 24 to the high-speed leased line network 30 is dropped/inserted by the V5 controller 27b and other control of the network management system 37.

In the frame relay interface 28 of 2M, the transmission and reception are synchronized at the physical layer by the physical layer synchronizing portion 28a connected to the high-speed leased line network 30 to perform a maintenance control by an LMI (local management interface) controller 28b. Upon the transmission to the high-speed leased line network 30, the path is determined by a DLCI setting portion 28f for identifying the connection in the interface with the users. In that case, when the frames are jammed, a jam notification controller 28d makes a notification such as FECN/BECN or the like.

Upon the reception from the high-speed leased line network 30, in excess of a prescribed frame number, those frames are properly abandoned at a frame abandoning controller 28e, and a tag setting portion 28f attaches a tag for easily switching the switchboard (FR-SW) 25.

Each portion of the interface 28 is controlled by a controller 28g connected to the control bus CB.

In the STM-1 interface 29, an OAM(Operation And Maintenance)/RM(Resource Management) controller 29b is substituted for the LMI controller 28b, a VPI/VCI setting portion 29c is substituted for the DLCI setting portion 28c, and a cell abandoning controller 29g is substituted for the frame abandoning controller 28e.

A shaping portion 29e uniforms the cells, an NPC (Network Parameter Control) portion 29f restricts the input of the cells, and a PPD (Partial Packet Discard)/EPD (Early Packet Discard) controller 29h abandons the following packeted data at a packet unit when a single ATM cell has been omitted or is going to be omitted.

Each portion of the interface 29 is controlled by a controller 29j connected to the control bus CB.

Figure 20:
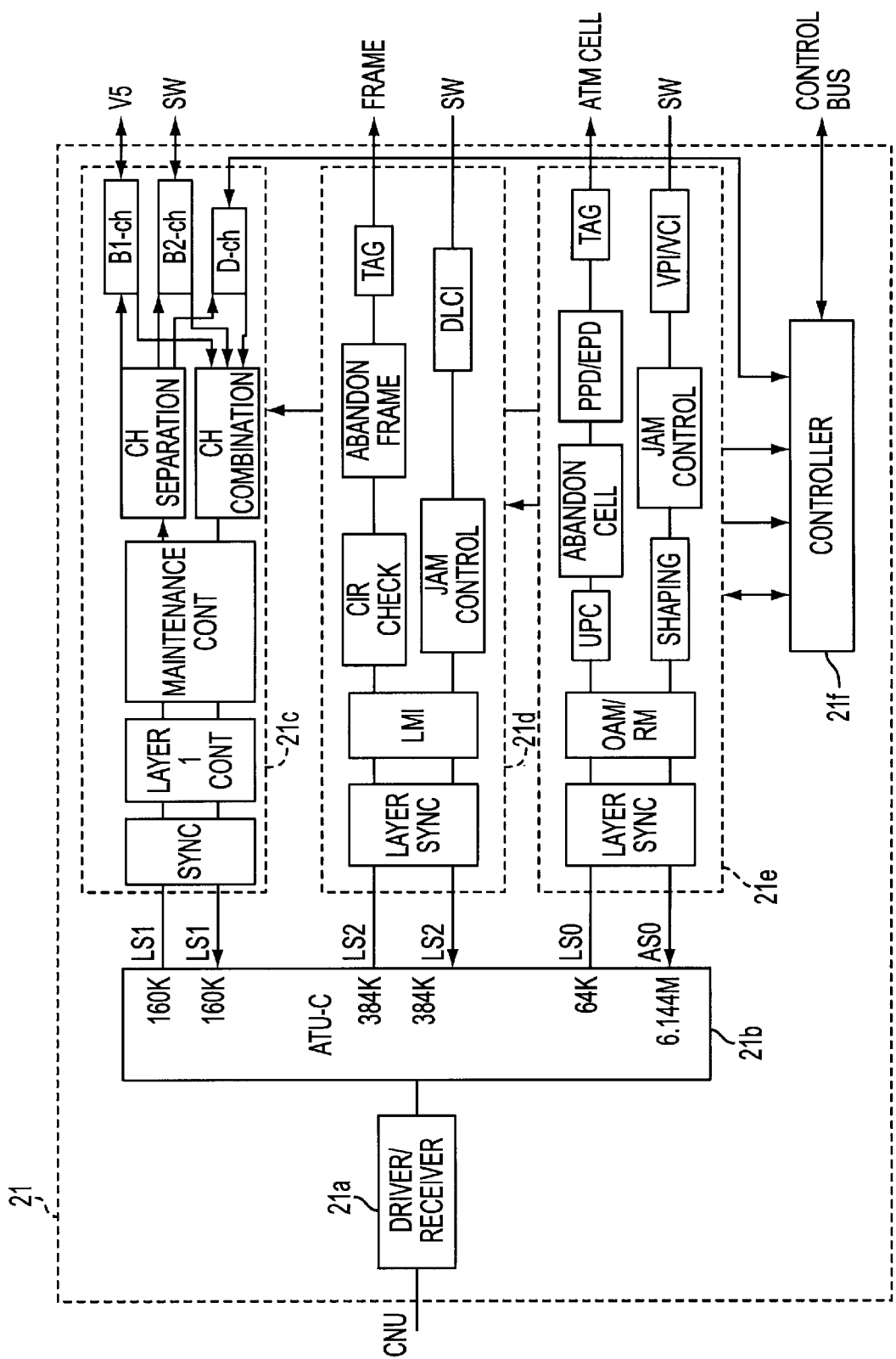
FIG. 20 is a block diagram showing an arrangement of a user interface in an access unit used in an integrated communication system of voice and data according to the present invention.

FIG. 20 shows a specific arrangement of the operation interface 21 as one example among the user interfaces 21–23 (see FIG. 2) in the access unit 20.

The user interface 21 separates, for each channel, the ADSL information at a transceiver portion (ATU-C) 21d through a driver/receiver 21a, and leads in the information into the following necessary interface portions 21c–21e.

In the ISDN interface 21c, a channel combination/separation circuit separates the data into B-ch data and D-ch data, the B-ch data being connected to the switchboard in the access unit 20. The D-ch data from the users is taken into a controller 21f in the user interface 21, and notified to the V5 controller 27b through the control bus CB.

The D-ch data to the users is notified through the opposite path. Maintenance operations such as the layer 1 start-up or loop designation are driven by the controller 21f in the unit.

In the frame relay interface 21d, as described referring to FIG. 19, the LMI controller for the maintenance operation with the user interface 21 is provided at the input stage. On the reception side of the frame relay, a CIR check circuit as a policing circuit, a frame abandoning controller, and a tag setting function at a frame relay switchboard (FR-SW) are provided.

On the transmission side, a jam notification function or a DLCI setting function are incorporated. The tag information, the DLCI information, the jam notification information, policing parameters, or the like are designated by the controller 21f. On the contrary, various status information or monitoring information are notified to the controller 21f.

In the cell relay interface 21e, an OAM control circuit is installed on the user interface side in which an RM control circuit is also required for the ABR support. On the reception side of the cell relay, a UPC circuit, as a policing circuit, a cell/packet abandoning control circuit, a tag setting function which facilitates the switching in the cell relay switchboard (CR-SW), or the like is provided.

On the transmission side, a jam notification (EFCI) function or a VPI/VCI setting function for identifying the connection in the interface with the users is incorporated. The tag information, the VPI/VCI information, the jam notification information, the policing parameters, or the like is designated by the controller 21f. On the contrary, various status information or monitoring information is notified to the controller 21f.

It is to be noted that each of the above-noted interfaces is not required to be equipped with all of the above-noted circuits but has to be equipped with some of them according to user's demand.

Figure 21:
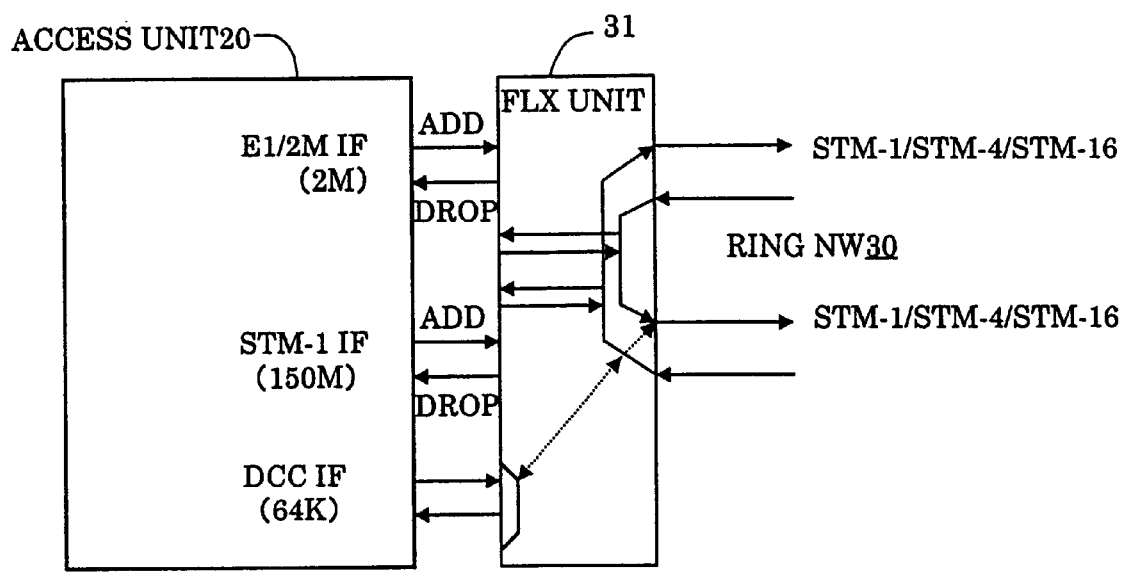
FIG. 21 is a block diagram showing a relationship between an access unit and a relay node in a high-speed leased line network used in an integrated communication system of voice and data according to the present invention.
Figure 22:
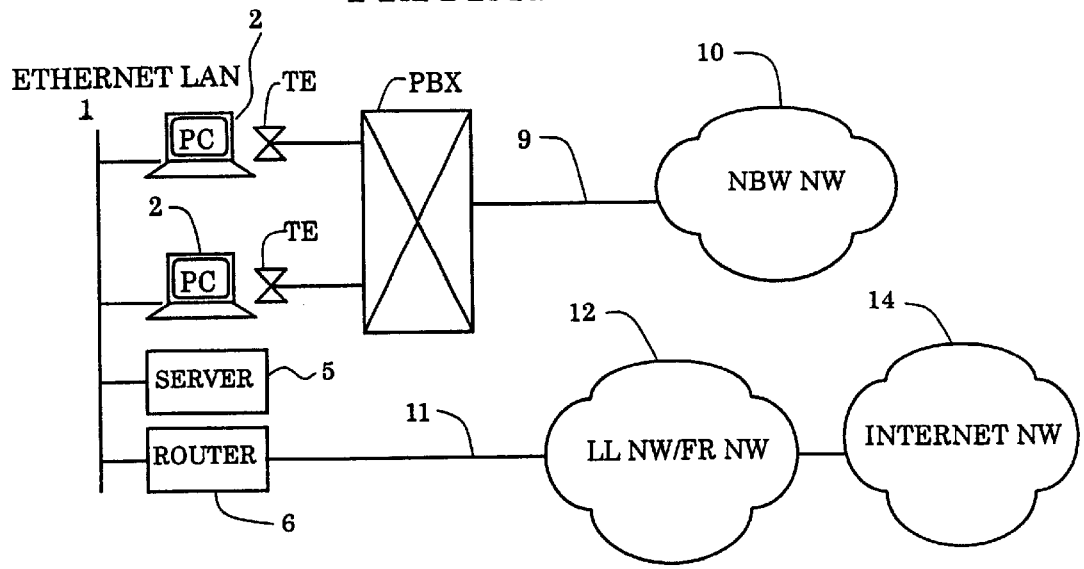
FIG. 22 is a block diagram showing an arrangement of a prior art communication system of voice and data.
Figure 23:
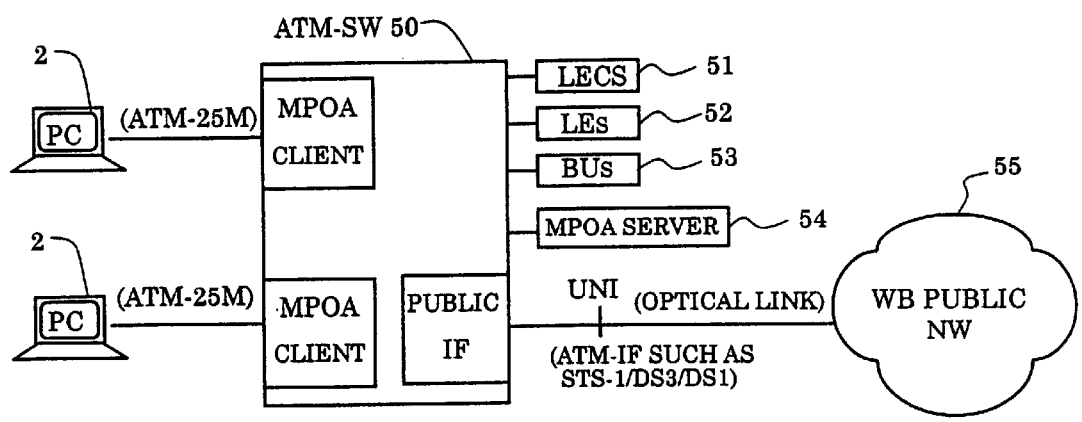
FIG. 23 is a block diagram showing an arrangement of a conventional communication system of voice and data including an office area in the form of a wide band.
Figure 24:
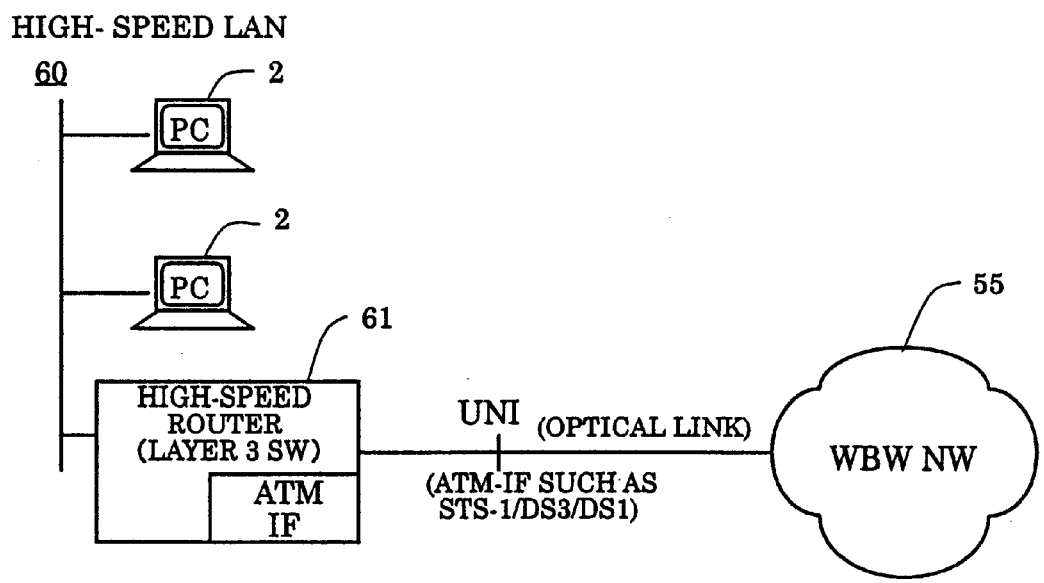
FIG. 24 is a block diagram showing another arrangement of a conventional communication system of voice and data including an office area in the form of a wide band.
Figure 25:
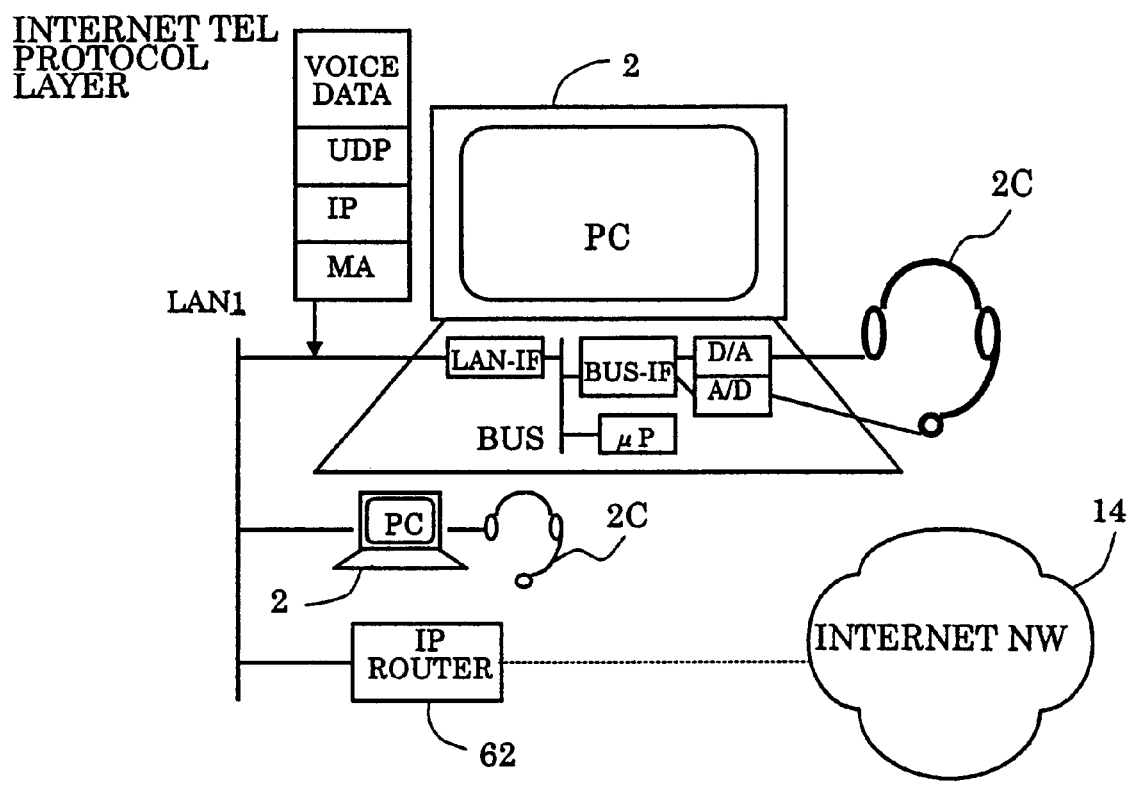
FIG. 25 is a block diagram showing an arrangement of internet telephone in a conventional communication system of voice and data.

For a relay node 31 in the high-speed leased line network 30 an existing system (FLX etc.) as shown in FIG. 21 can be used as it is. Between the relay nodes, optical links of 150M, 600M, 2.4G etc. are set up according to the necessity. The links form a ring so that a protection function upon the link fault may be effectively performed.

The lead-in portion (add/drop portion) of the relay node 31 to the access unit 20 has the combination of 2M×n and 150M×1. The setting of the internal path of the leased line network is made by the control from the network management system 37.

The Digital Communication Channels (DCC) for the communication between the network management system 37 and the access unit 20 is preliminarily assigned to the overhead portion of SDH as prescribed by ITU-T. The relay node 30 leads in the channel for the connection with the access unit 20. Also, the connection of the high-speed leased line network 30 to the user interfaces 21–23 without any change enables the high-speed leased line network for leading-in the users to be operated.

As described above, according to an integrated communication system of voice and data according to the present invention, the following effects are obtained:

(1) By changing a LAN interface board in a personal computer, a high quality voice communication is made possible at the data link level (MAC layer) by utilizing LAN on Ethernet. As a result, a big PBX system is made needless so that telephones on desks or conventional voice lines are also made needless. Since, no telephone number is required for telephone communication in an office, no telephone number management is required but only DNS/IP address is required.

(2) The provision of an ISDN interface server on the LAN for the connection with an ISDN line enables a public ISDN line to be directly connected through the LAN from the personal computer.

(3) Putting an ADSL multiplexer on the user side and an interface on the access unit enables a new data communication demand from the user to be dealt with by using a conventional voice pair wire without any change. Specifically, an existing interface (ISDN interface) and a novel interface (frame relay interface, cell relay interface) can be multiplexed for each channel.

(4) Connecting the ISDN line from the users to an ADSL line and an existing end switchboard by utilizing a voice processing system in the access network enables a conventional voice communication service to be used without any change to an existing voice communication system.

(5) Connecting a frame relay from the users to the ADSL line and a frame relay switching system (PVC) in the access network enables a frame relay data communication to be operated between the user terminal equipments. If the users are connected with each other through the leased line around the existing frame relay network, a frame relay system in the access network can be substituted for the leased line and connected to the existing frame relay.

(6) Connecting a cell relay (ATM) from the users to the ADSL line and a cell relay switching system (PVC) in the access network enables a cell relay data communication to be made between the user terminal equipments. For example, if the cell relay interface is connected to ISP supporting itself, a high-speed internet communication can be made whereby MPEG data transmission to the user terminal equipments or a high-speed down-loading of a large amount of data base can be made possible.

What is claimed is:

1. An integrated communication system for voice and data connecting an Ethernet LAN to an external communication network comprising;
   a personal computer connected to the LAN and having an interface stored therein for transferring a voice signal at a data link level without processors;
   an ISDN voice interface connected to the LAN and for connecting the personal computer to the external communication network with a voice channel;
   various routers for performing data communication on the LAN and having an interface with the external communication network;
   a multiplexer for multiplexing/demultiplexing input/output data of the ISDN voice interface and the routers in a plurality of channels; and
   an access network having a user interface for connecting input/output data of the multiplexer to the external communication network.

2. An integrated communication system of voice and data as claimed in claim 1 wherein the access network comprises an access unit connected to the multiplexer by means of wire, and a relay node group connected to the access unit to form a high-speed leased line network having a high-speed optical circuit connected to the external communication network in the form of a ring.

3. An integrated communication system of voice and data as claimed in claim 1 wherein the personal computer, the ISDN voice interface, and the routers designate a destination address by IP address.

4. An integrated communication system of voice and data as claimed in claim 1 wherein the routers comprise an ISDN interface connecting transmission/reception signals with a public ISDN circuit.

5. An integrated communication system of voice and data as claimed in claim 3 wherein the routers comprise an ISDN interface connecting transmission/reception signals with a public ISDN circuit.

6. An integrated communication system of voice and data as claimed in claim 1 wherein the routers comprise a router connected to a frame relay circuit.

7. An integrated communication system of voice and data as claimed in claim 3 wherein the routers comprise a router connected to a frame relay circuit.

8. An integrated communication system of voice and data as claimed in claim 1 wherein routers comprise a router connected to a cell relay circuit.

9. An integrated communication system of voice and data as claimed in claim 3 wherein routers comprise a router connected to a cell relay circuit.

10. An integrated communication system of voice and data as claimed in claim 1 wherein the personal computer and the ISDN voice interface have means for controlling data synchronization and abandoned frames in a voiceless condition.

11. An integrated communication system of voice and data as claimed in claim 3 wherein the personal computer and the ISDN voice interface have means for controlling data synchronization and abandoned frames in a voiceless condition.

12. An integrated communication system of voice and data as claimed in claim 2 wherein the access unit comprises an interface connected to the ISDN communication network as the external communication network through the high-speed leased line network.

13. An integrated communication system of voice and data as claimed in claim 2 wherein the access unit comprises an interface connected to the frame relay communication network as the external communication network through the high-speed leased line network.

14. An integrated communication system of voice and data as claimed in claim 2 wherein the access unit comprises an interface connected to the cell relay communication network as the external communication network through the high-speed leased line network.

15. An integrated communication system of voice and data as claimed in claim 2, further comprising a network management system for setting a PVC path of the frame relay, a PVC path of the cell relay, and various parameters in the frame/cell relay through the high-speed leased line network.

16. An integrated communication system of voice and data as claimed in claim 2, further comprising an interface connected to the Ethernet LAN and transferring a voice signal at the data link level without processors.

17. An integrated communication system of voice and data as claimed in claim 1 wherein the multiplexer comprises an ADSL multiplexer.

* * * * *